United States Patent [19]

Holz

[11] 4,047,169

[45] Sept. 6, 1977

[54] DISPLAY PANEL HAVING IMPROVED ARRANGEMENT OF RESET CELLS FOR FACILITATING SCANNING OF THE PANEL

[75] Inventor: George E. Holz, North Plainfield, N.J.

[73] Assignee: Burroughs Corporation, Detroit, Mich.

[21] Appl. No.: 656,657

[22] Filed: Feb. 9, 1976

[51] Int. Cl.[2] .................................................. G06F 3/14

[52] U.S. Cl. ................................ 340/324 M; 313/201; 315/169 TV

[58] Field of Search .................... 315/169 R, 169 TV; 313/201; 340/324 M, 173 PL, 343

[56] References Cited

U.S. PATENT DOCUMENTS 2,847,615 8/1958 Engelbart ............................ 313/201

*Primary Examiner*—Marshall M. Curtis
*Attorney, Agent, or Firm*—Kevin R. Peterson; Robert A. Green

[57] ABSTRACT

The panel comprises a gas-filled envelope which contains a series of column cathode strips, which are oriented parallel to each other, and include a first cathode strip, a last cathode strip, and intermediate cathode strips. Means are provided which form, with the cathode strips, columns of priming cells and columns of display cells which, in panel operation, are scanned sequentially and repetitively to display characters. The columns of cells, thus, also include a first column, a last column, and intermediate columns. A two-part reset electrode arrangement is provided adjacent to the first cathode strip and the first column of cells to insure proper start of a scanning cycle. The reset arrangement comprises a column electrode, and a plurality of short horizontal electrode bars which extend between the column electrode and the first cathode strip. The reset electrodes provide excited particles which insure turn-on of the first column of priming cells at the beginning of a scanning cycle.

6 Claims, 5 Drawing Figures

Fig. 3
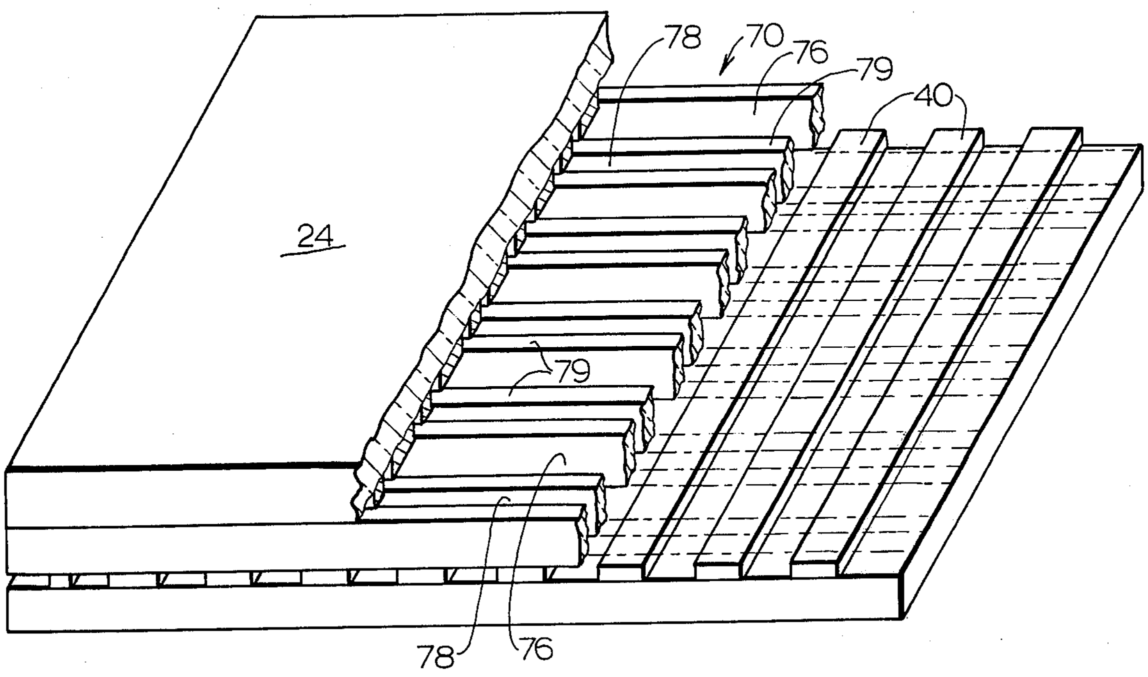
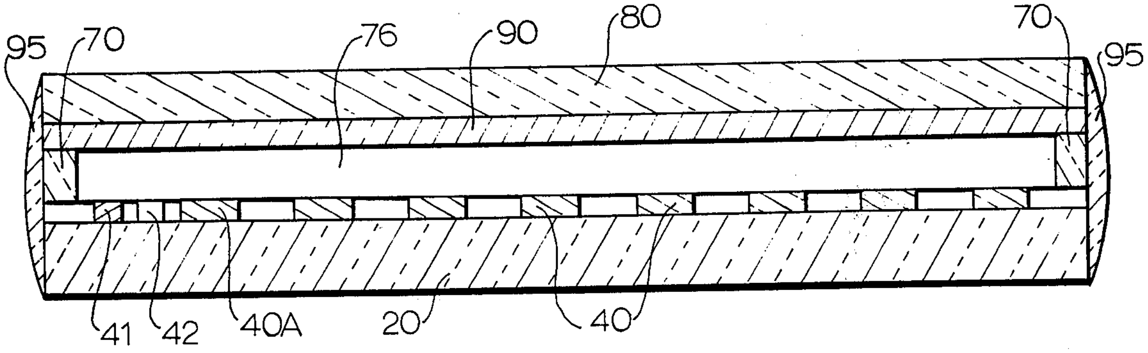
Fig. 4

DISPLAY PANEL HAVING IMPROVED ARRANGEMENT OF RESET CELLS FOR FACILITATING SCANNING OF THE PANEL

BACKGROUND OF THE INVENTION

The principles of the present invention are applicable to SELF-SCAN panels of the type shown and described in patents and applications cited below, and particularly, to SELF-SCAN panels of the type described and claimed in copending application Ser. No. 551,359, filed Feb. 20, 1975. The panels described therein are relatively simple in construction and operation; however, a problem sometimes arises in initiating a scanning cycle in which the columns of cathodes are scanned one by one. The present invention solves this problem.

SUMMARY OF THE DISCLOSURE

The disclosure is of a display panel including a series of column cathodes which form columns of priming cells and columns of display cells which are scanned sequentially and repetitively to display characters. The columns of cells include a first column, a last column, and intermediate columns, and a two-part reset electrode arrangement is provided adjacent to the first column of priming cells to insure proper turn-on of the first column of priming cells at the start of a scanning cycle.

DESCRIPTION OF THE DRAWINGS

FIG. 3 is a perspective view, partly in section, of the panel of FIG. 1 assembled;

FIG. 4 is a sectional view, along the lines 4—4, in FIG. 1; and

DESCRIPTION OF THE PREFERRED EMBODIMENTS

Figure 1:
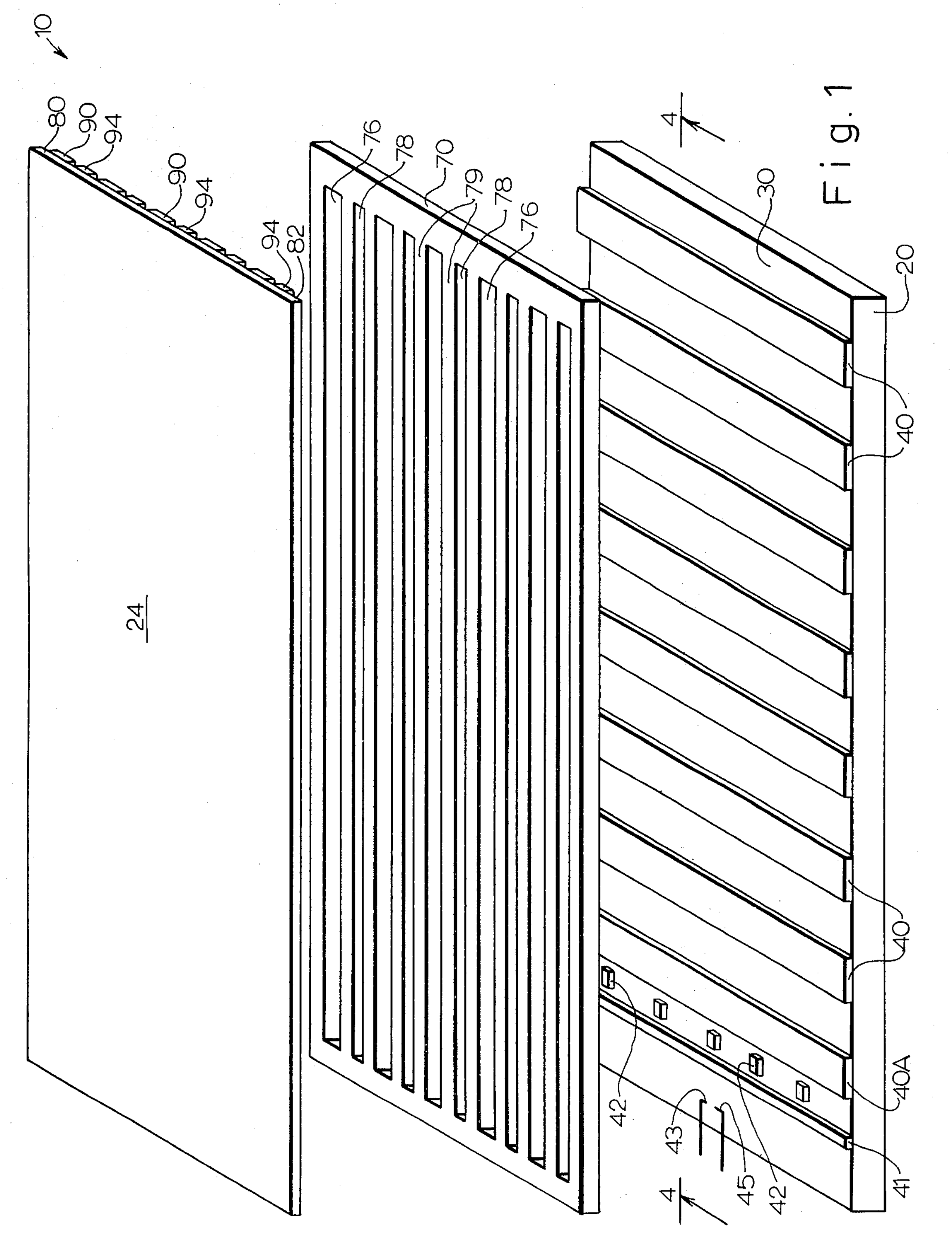
FIG. 1 is an exploded perspective view of a display panel embodying the invention.

A display panel 10 embodying the invention includes a gas-filled envelope made of a glass base plate 20 and a glass face plate 24 hermetically sealed together, with the face plate serving as the viewing window for the envelope. The base plate 20 has a top surface 30, on which are provided a series of vertical cathode strips 40 of conductive material, disposed parallel to each other with their top surfaces facing the face plate. For purposes of illustrating the invention, it is assumed that the series of cathodes begins at the left with cathode 40A and proceeds to the right. The cathode electrodes 40 are formed, for example, by a screen printing process using any suitable material such as a mixture of nickel and glass frit in a suitable binder.

As illustrated in FIG. 3, the top surfaces of the cathode strips 40 are divided into a plurality of operating areas. Each cathode thus forms a column of such areas. Each of the cathode strips is subdivided in the same way so that rows of similar operating areas are formed. The subdivision of the surfaces of the cathodes forms areas 40D and 40P which are operated, in a completed panel, as display cathode areas and as priming cathode areas, respectively. The priming areas 40P are used to generate excited particles for use by the display areas 40D, which are electrically selected by input information signals, to produce a pattern of glowing areas which represent characters seen by a viewer through the face plate. The cathode priming areas, which are not seen by a viewer, may be smaller than the display areas.

Figure 2:
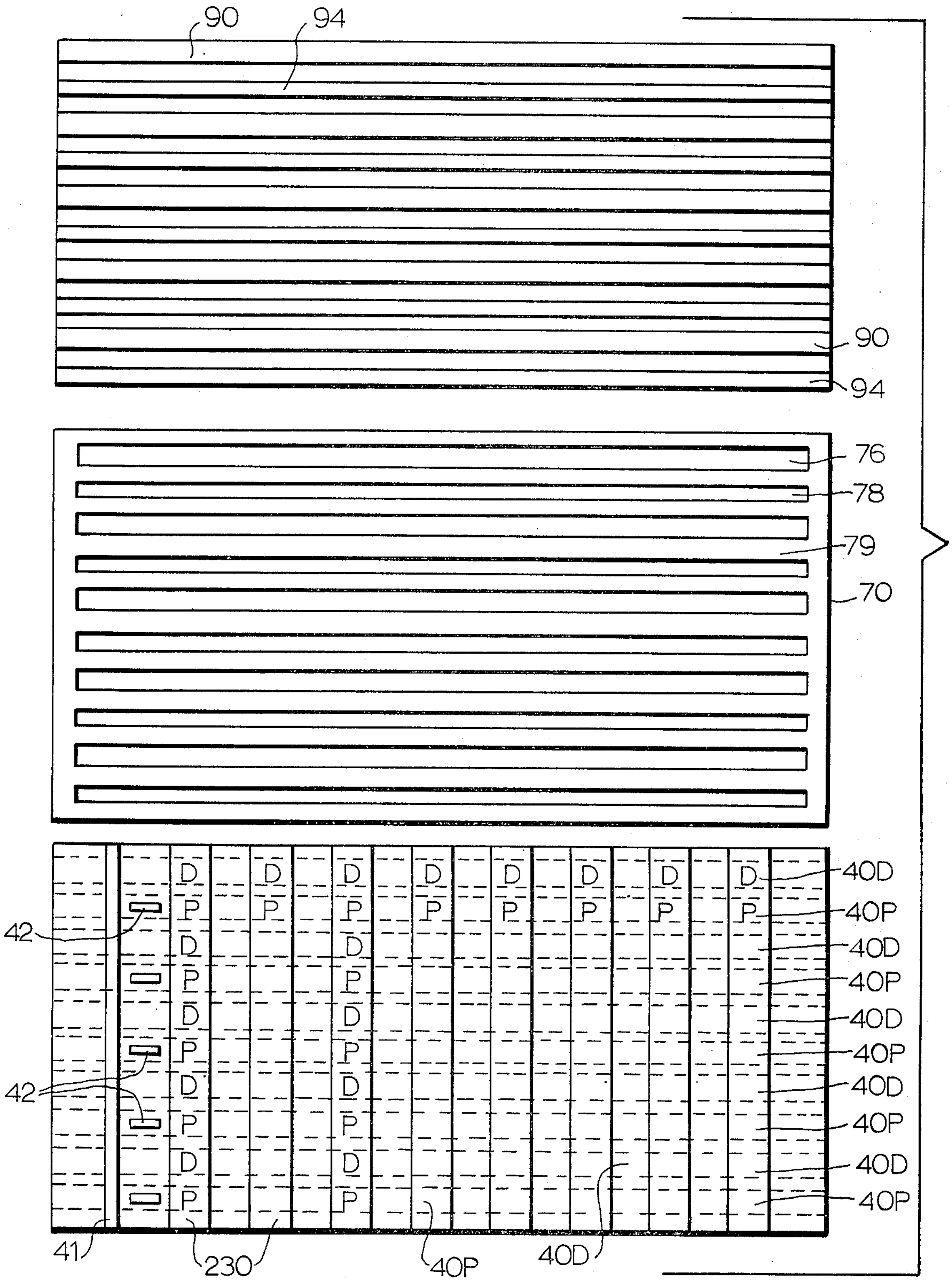
FIG. 2 is an exploded plan view of the parts of the panel of FIG. 1.

As illustrated in FIG. 2, the display and priming areas may alternate with each other in a column; or, as described in U.S. Pat. No. 3,683,364, a "shared scan" arrangement may be used in which each two display areas 40D have a priming area 40P between them. Other arrangements may also be used.

The means for dividing the surface may be any of those shown in application Ser. No. 551,359, but the preferred means is a slotted insulating plate 70 in which walls 79 form channels 76 and 78 which define the rows of display areas and priming areas. The plate 70 is seated on the cathode strips 40 between the base plate 20 and face plate 24, with each slot 76 overlaying a row of display cathodes 40D, and each slot 78 overlaying a row of priming or scan cathodes 40P.

According to the invention, the panel 10 is provided with a reset mechanism including, first, a column cathode strip 41 disposed adjacent to and generally parallel to cathode 40A and a plurality of short horizontal cathode bars 42 disposed between and close to both cathode strip 41 and first cathode 40A. The horizontal cathodes 42, in effect, bridge the gap between cathode strip 41 and the first cathode 40A and are preferably aligned with priming areas 40P. One cathode bar 42 is provided for each priming area 40P.

The column cathode 41 and the portions of the priming anodes 94 adjacent to it form a column of reset cells, and the cathodes 42 and the portions of the priming anodes 94 adjacent to them form, in effect, rows of reset cells.

In addition, at least one keep-alive cell, comprising a cathode 43 and an anode 45, is provided close to the reset cathode 41, as is well known in the art. U.S. Pat. No. 3,886,389 is one of many patents which illustrate the use of a reset cathode and a keep-alive cell in a cell scanning device.

The panel face plate 24 carries on its inner surface 82 a plurality of transparent conductive display anode electrodes 90 of tin oxide or the like, each such anode overlaying a slot 76 in the center plate and a row of display cathodes. The face plate also carries on its inner surface a plurality of opaque priming anodes 94, each such anode overlaying a slot 78 and a row of priming cathodes. The walls 79 of plate 70 present a barrier between adjacent anodes.

Each crossing of a display anode and a display cathode area defines a display cell, each crossing of a priming anode and a priming cathode area defines a priming cell, and each crossing of a priming anode and the reset cathode 41 and 42 defines reset cells.

The panel 10 is filled with a suitable ionizable gas such as neon, xenon, or the like, singly or in combination, at a suitable pressure. The gas atmosphere also includes mercury vapor to minimize cathode sputtering.

Figure 5:
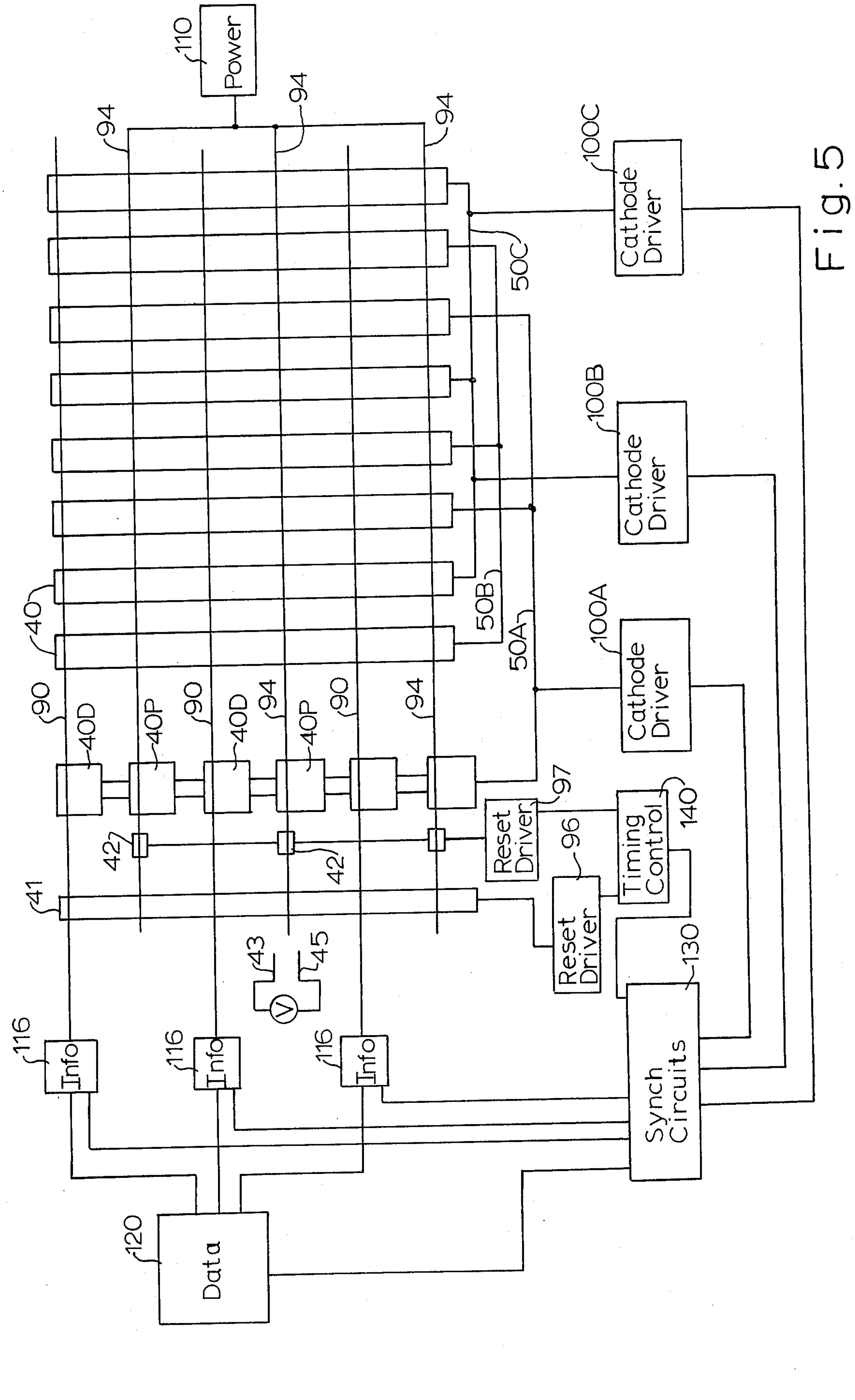
FIG. 5 is a schematic representation of the panel of FIG. 1 and a system in which it may be operated.

The display panel 10 is operated in the same manner as the panels described in the above-identified application Ser. No. 551,359, and one system for performing this operation is shown in FIG. 5. In this system, the cathode strips 40, with their operating areas shown schematically and with the letter D applied to display areas and the letter P applied to priming areas, are electrically connected in groups by means of leads 50A, 50B, 50C, with every fourth cathode electrode strip being in the same group so that there are three such groups of strips. It will be clear to those skilled in the art, from the following description of the invention and from information already known about SELF-SCAN panels, that other electrode groupings can be used or even that each electrode can be separately connected to an external circuit. The keep-alive electrodes 43 and 45 are connected to a source of potential V, by means of which the keep-alive cell is energized and generating excited particles. The reset cathode 41 is connected to a reset driver 96, and the reset cathodes 42 are connected together to reset driver 97. The cathode strips 40 are connected by their conductors 50 to separate cathode drivers 100 for separately connecting each cathode group in an operating circuit. All of the priming anodes 94 are connected together through a suitable resistive path, if required, to a source of generally positive operating potential 110. Each of the display anodes 90 is connected through a separate, suitably resistive path to a source 116 of information signals which themselves are connected to a data source 120 which may include a computer, encoders, decoders, character generator, and the like circuit modules. A synchronizing control circuit 130 is provided for interrelating the various circuit elements to operate as described below. Control circuit 130 is coupled through a timing control circuit 140 to the reset cathode drivers 96 and 97.

With the keep-alive cell On, and all of the priming anodes 94 held at ground potential, for example, the reset cathodes are energized as follows by the circuit 130. Both reset drivers 96 and 97 are turned on at substantially the same time to apply negative potential, about 30 volts negative with respect to the priming anodes 94, to the reset cathode 41 and reset cathodes 42. Potential is applied to cathode 41 for a short time sufficient to permit cathode glow to spread along the entire length of the cathode; however, potential is maintained on the cathodes 42 for a longer time to insure the presence of a supply of excited particles adjacent to the first column of priming cells to insure that they all turn on when they are energized.

In one mode of operation, the reset column time is about 50–60 microseconds, reset cathode 41 is energized for about one-third of that time, and cathodes 42 are energized for substantially the full column time.

After the reset cathodes have been thus energized and with operating potential applied to the priming anodes, the cathode drivers 100 are turned on sequentially so that the columns of priming cathodes are energized sequentially, and simultaneously, selected display anodes are energized in accordance with input signal information to cause selected display cathode areas to glow and to display a character. This operation is described in greater detail in application Ser. No. 551,359.

What is claimed is:

1. A display panel comprising a gas-filled envelope having a base plate and face plate hermetically sealed together, said face plate having a viewing window, an array of rows and columns of first gas-filled cells for displaying characters in said envelope, said cells including a first column, a last column and intermediate columns, electrodes coupled to said cells for scanning said cells, column by column sequentially, beginning with the first column, and a plurality of auxiliary cells adjacent to said first column of first cells, said auxiliary cells being used not for veiwing but for insuring turn-on of all of the cells in said first column of cells, said auxiliary cells including a column of auxiliary cells adjacent to said first column of first cells and a plurality of rows of auxiliary cells between said column of auxiliary cells and said first column of first cells.

2. The panel defined in claim 1 and including electrodes coupled to said auxiliary cells for turning on said auxiliary cells before said first column of first cells is turned on.

3. A display panel comprising a gas-filled envelope having a base plate and face plate hermetically sealed together, said face plate having a viewing window, an array of rows and columns of first gas-filled cells for displaying characters in said envelope, said cells including a first column, a last column and intermediate columns, electrodes coupled to said cells for scanning said cells, column by column sequentially and repetitively, beginning with the first column, and a column of auxiliary cells adjacent to said first column of first cells, said column of auxiliary cells including anode electrode means and cathode electrode means, said cathode electrode means including a first vertical electrode disposed parallel to said columns of first cells and a plurality of horizontal electrodes disposed between said vertical electrode and said first column of first cells.

4. A display panel including a gas-filled envelope having a base plate and a face plate hermetically sealed together, said face plate having a viewing window, a plurality of parallel primary cathode strips disposed generally vertically on said base plate, there being a first primary cathode strip, a last primary cathode strip, and a plurality of intermediate primary cathode strips, a plurality of horizontal anodes on said face plate, said anodes overlying said primary cathode strips, each crossing of an anode and a primary cathode strip defining a primary glow discharge cell, a first auxiliary cathode strip disposed vertically adjacent to the first of said primary cathode strips, said auxiliary cathode forming, with said anodes, a plurality of reset cells, and a plurality of second auxiliary cathode strips disposed horizontally between said first auxiliary cathode strip and said first primary cathode strip and forming auxiliary reset cells with said anodes, whereby, in a scanning operation performed by said panel, first all of said reset cells are energized and exhibit glow discharge and generate excited particles, and said auxiliary reset cells are energized and exhibit glow discharge and generate excited particles which facilitate turn-on of selected ones of the primary glow discharge cells formed by the first of said primary cathode strips and said anodes.

5. The panel defined in claim 4 and including means subdividing the surfaces of said primary cathode strips into a plurality of separate cathode operating areas, said cathode operating areas being aligned in rows, there being an anode overlying each such row of cathode operating areas, said second auxiliary cathode strips being aligned with selected ones of said rows of cathode operating areas.

6. The panel defined in claim 4 and including means subdividing the surfaces of said primary cathode strips into a plurality of separate cathode operating areas including priming cathode areas and display cathode areas, said priming cathode operating areas being aligned in rows and said display cathode areas being aligned in rows, there being an anode overlying each such row of cathode operating areas, said second auxiliary cathode strips being aligned with said rows of priming cathode areas.

* * * * *